United States Patent [19]

Tanaka et al.

[11] Patent Number: 4,779,166
[45] Date of Patent: Oct. 18, 1988

[54] ILLUMINATING APPARATUS

[75] Inventors: Akira Tanaka, Kawasaki; Shinpei Nagatani, Yokohama; Hisashi Sawada, Kawasaki; Eietsu Takahashi, Machida; Noboru Wakatsuki, Kawasaki; Takehisa Takoshima, Kawasaki; Fumiaki Yamada, Kawasaki, all of Japan

[73] Assignee: Fujitsu Limited, Kawasaki, Japan

[21] Appl. No.: 129,847

[22] Filed: Dec. 8, 1987

[30] Foreign Application Priority Data

Dec. 19, 1986 [JP] Japan ................... 61-301166
Mar. 9, 1987 [JP] Japan ................... 62-53826
Jul. 29, 1987 [JP] Japan ................... 62-187679
Aug. 8, 1987 [JP] Japan ................... 62-198617

[51] Int. Cl.$^4$ .............................................. F21V 7/04
[52] U.S. Cl. ...................................... 362/31; 362/32; 362/84; 362/307
[58] Field of Search ............... 362/84, 31, 32, 293, 362/311, 307, 806, 812, 260

[56] References Cited

U.S. PATENT DOCUMENTS

| 4,460,940 | 7/1984 | Mori | 362/32 |
| 4,471,412 | 9/1984 | Mori | 362/32 |
| 4,733,332 | 3/1988 | Yamashita et al. | 362/32 |

Primary Examiner—Stephen F. Husar
Attorney, Agent, or Firm—Staas & Halsey

[57] ABSTRACT

An illuminating apparatus which comprises a plane board composed of a transparent resin having an organic fluorescent dye incorporated therein and a light-reflecting member arranged on at least a part of the back surface of the plane board, wherein a light incident from at least a part of the end face of the plane board is emitted from at least a part of the surface of the plane board.

9 Claims, 5 Drawing Sheets

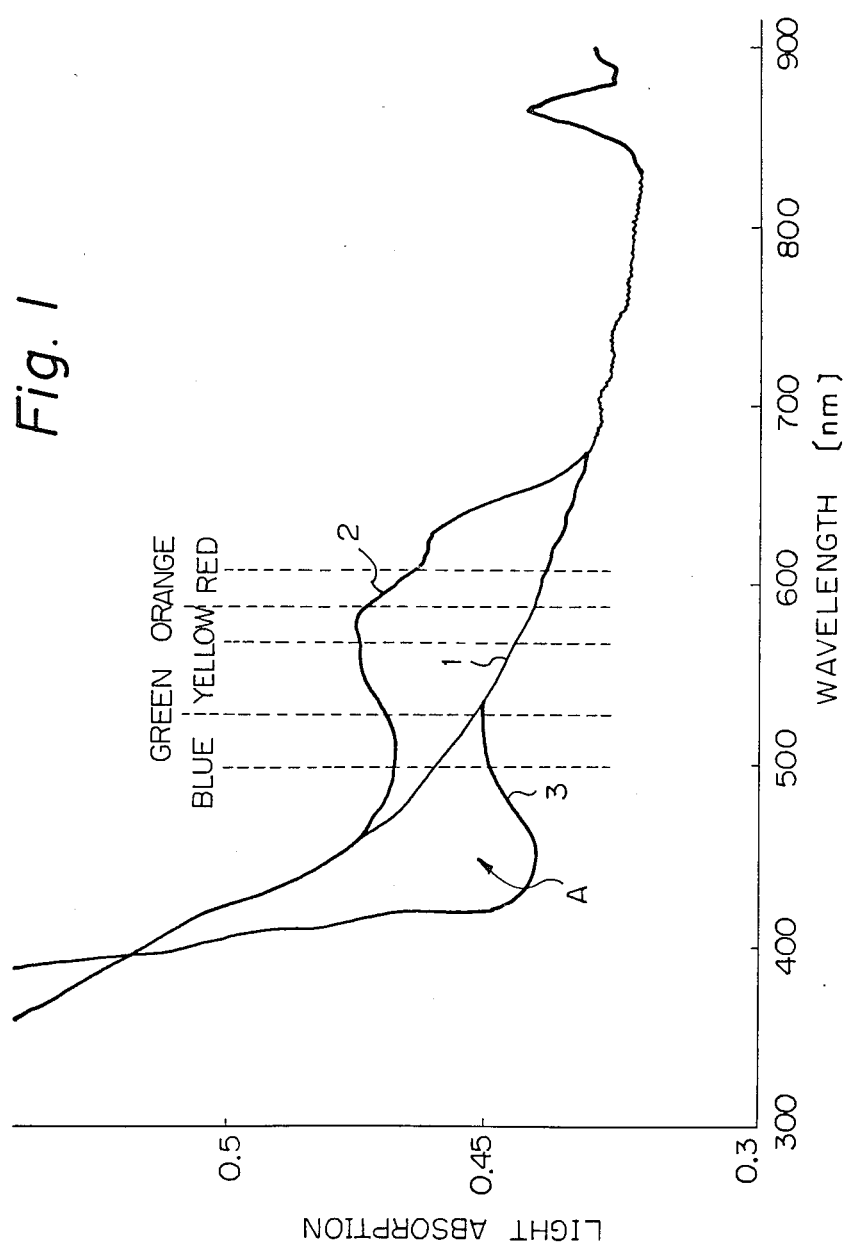

ILLUMINATING APPARATUS

BACKGROUND OF THE INVENTION

1. Field of the Invention

The present invention relates to an illuminating apparatus. More particularly, the present invention relates to an illuminating apparatus for obtaining a plane illumination having a high luminous intensity.

2. Description of the Related Art

A polycarbonate resin is defective in that, because of a transition absorption of electrons by the $\pi\text{-}\pi^*$ transition of the double bond in the benzene nucleus contained in the chemical structure, lights in the small-wavelength visible ray region (especially blue and green colors) are absorbed, the resultant light is tinged with yellow or orange, and the resin does not appear to be transparent, as shown in FIG. 1. In FIG. 1, the wavelength (nm) is plotted on the abscissa and the light transmission is plotted on the ordinate. The light transmission of polycarbonate is shown by curve 1.

To eliminate this defect, a method has been adopted in which a pigment having a maximum absorption to yellow or orange (generally called "a blueing agent") is incorporated to maximize the transmission of the wavelength corresponding to blue and produce a blueish tint. The light transmission of the blueing agent-incorporated polycarbonate is shown by curve 2 in FIG. 1.

However, the absorption at the left half portion of curve 2 is large and the resin is not transparent in the blue-to-red region, also the resin is practically useless from the viewpoint of an efficient transmission of the overall wavelength.

SUMMARY OF THE INVENTION

It is a primary object of the present invention to provide an illuminating apparatus capable of transmitting light of the entire visible ray wavelength region at a high efficiency and obtaining a plane illumination having a high luminous intensity.

In accordance with the present invention, there is provided an illuminating apparatus which comprises a plane board composed of a transparent resin having an organic fluorescent dye incorporated therein and a light-reflecting member arranged on at least a part of the back surface of the plane board, wherein a light incident from at least a part of the end face of the plane board is emitted from at least a part of the surface of the plane board.

BRIEF DESCRIPTION OF THE DRAWINGS

FIG. 1 shows light absorption curves of a molded body of a polycarbonate resin and a molded body of a polycarbonate resin having an organic fluorescent dye or pigment incorporated therein;

FIGS. 3 through 6A and 6B are diagrams illustrating other embodiments of the illuminating apparatus of the present invention;

DESCRIPTION OF THE PREFERRED EMBODIMENTS

As the transparent resin suitable for use in the present invention, there can be mentioned polycarbonate, polystyrene, polymethyl methacrylate and a blend of polymethyl methacrylate and polyvinylidene fluoride.

Organic fluorescent dyes suitable for use in the present invention include perylene type dyes, naphthalimide type dyes, and cumarine type dyes.

Since the energy of the entire visible ray wavelength region is efficiently transmitted by incorporating an organic fluorescent dye into, for example, a polycarbonate resin, the light energy of the ultraviolet wavelength region exceeding the visible ray wavelength region is absorbed, a blue fluorescent color is absorbed, and the appearance becomes blueish or white. The wavelength dependency of the transmission of a polycarbonate resin in which a naphthalimide type fluorescent dye represented by the following formula:

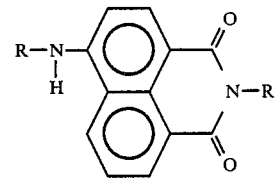

in which R stands for an atomic group such as an alkyl group, is incorporated in an amount of 0.01% by weight is shown by curve 3 in FIG. 1.

Namely, in a plane board of this blue fluorescent dye-incorporated polycarbonate resin, a light window A corresponding to a wavelength of 440 nm in the violet-blue visible ray wavelength region is present, and the board is tinged with blue. It is seen that the transmission is improved in the entire visible ray wavelength region over the conventional polycarbonate resin having a blueing pigment (Anthraquinone Blue) incorporated therein, which is shown by curve 1 in FIG. 1.

In the above-mentioned embodiment, the blue fluorescent dye is incorporated in an amount of 0.01% by weight as pointed out above, but according to the present invention, satisfactory results can be obtained if the fluorescent dye is incorporated in an amount of 0.001 to 0.1% by weight.

Figure 2A:
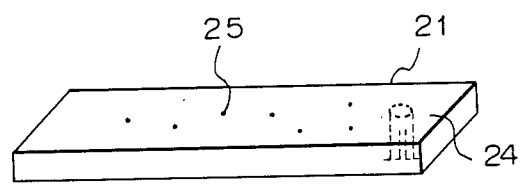
FIGS. 2A and 2B are diagrams illustrating a first embodiment of the illuminating apparatus of the present invention.
Figure 2B:
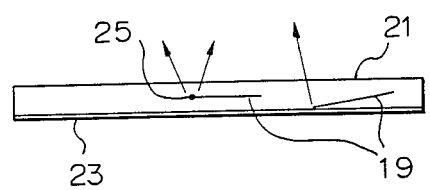

FIG. 2A is a perspective view of a light guide according to a first embodiment of the illuminating apparatus of the present invention, and FIG. 2B is a sectional view of this light guide 21.

Referring to FIG. 2, the sectional shape of the light guide is flat, and a fluorescent dye 25 is uniformly incorporated in the whole light guide composed of a transparent resin. As is seen from the sectional view of FIG. 2B, light 19 from a light source such as a tungsten lamp or LED or a fluorescent lamp impinges against the fluorescent dye 25 and is scattered thereon. If a reflecting layer 23 such as a white paint layer, an aluminum foil or a roughened surface is formed on the back side of the light guide, the light is reflected substantially completely and emitted from the surface of the light guide 21 to provide a high luminous intensity.

Figure 3:
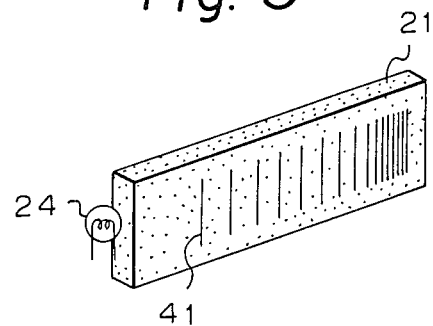
Figure 4:
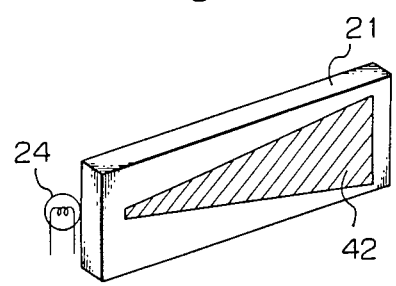

FIGS. 3 and 4 are perspective views showing embodiments in which a reflectance-variable reflecting portion is formed as the reflecting layer 23 of the light guide shown in FIG. 2. In the light guide shown in FIG.

3, notches 41 are formed as the reflecting portion on the back face of the light guide orthogonally to the direction of an advance of the light. The notche 41 are formed by producing mountains and troughs alternately on the back face of the light guide 21, and making the intervals between every two adjacent notches narrower toward the side opposite to the light source 24. Accordingly, in the portion close to the light source 24, the quantity of the light reflected from the interior of the light guide is relatively small and there is a light emitted to the side opposite to the illumination side, but at a part remote from the light source 24, the quantity of the light reflected into the interior of the light guide is relatively increased. Accordingly, the quantity of the light from the emitting surface is not decreased even if the distance from the light source is increased.

FIG. 4 is a perspective view illustrating still another embodiment of the present invention where a light-reflecting film is used. An opaque film 42, for example, a white paint film, is applied to the back face of the light guide 21 by coating or bonding using an adhesive, so that the amount of the film to the light is increased toward the side opposite to the light source, that is, the length orthogonal to the direction of advance of the light is increased. Although a part of the light incident to the light guide 21 from the light source 24 is emitted to the side opposite to the illumination side, the quantity of the light reflected into the interior of the light guide 21 is relatively increased toward the side opposite to the light source 24.

If the reflectance-variable reflecting layer is arranged as shown in FIGS. 3 and 4, the light from the light source arranged on one side of the light guide is emitted uniformly to the surface and a uniform plane illumination can be provided.

Figure 5:
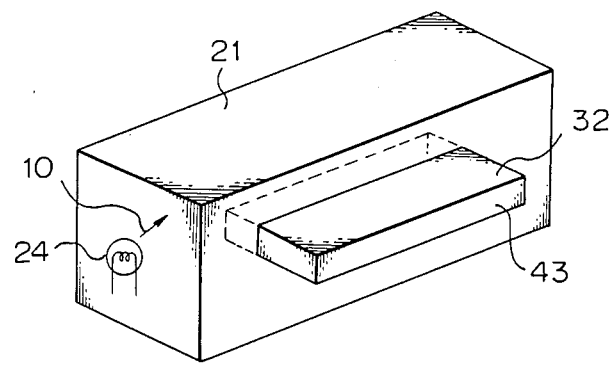

FIG. 5 is a perspective view illustrating still another embodiment of the present invention where a light-guiding member 32 is arranged on the front side of a light guide 21 having a structure as shown in FIG. 2. This light-guiding member 32 is a plate having a light-emitting face 43, which is pushed into the light guide 21 in a direction substantially vertical to the light incident to the light guide 21, whereby the incident light is preferentially emitted from the going-out face 43. In view of the brightness of the emitted light, preferably the light-guiding member 32 is composed of a transparent resin containing an organic fluorescent dye.

Figure 6A:
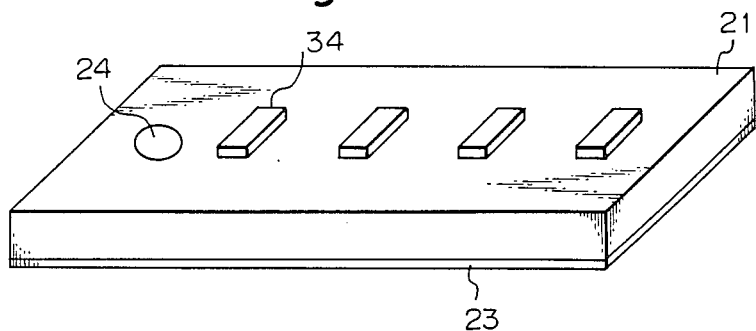
Figure 6B:
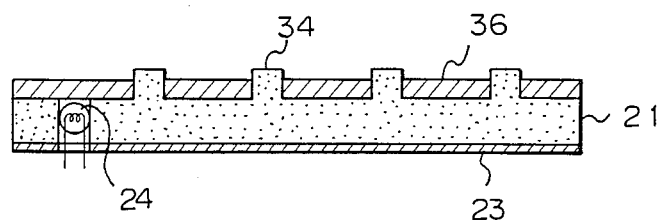

FIG. 6 illustrates an embodiment in which a projection 34 is formed in an area, for which illumination is desired, of the front surface of a light guide 21 having a structure as shown in FIG. 2; wherein FIG. 6A is a perspective view of this embodiment and FIG. 6B is a sectional view. The light incident from the light source 24 is emitted from the surface of the light guide 21, and if the surface of the light guide 21 except the portion of the projection 34 is covered with a mask 36 composed of an opaque material, illumination is obtained only in the portion of the projection 34 occupying the area for which illumination is required.

The illuminating apparatus of the present invention can be used as a back light to be built in a liquid crystal television or liquid crystal display.

Figure 7:
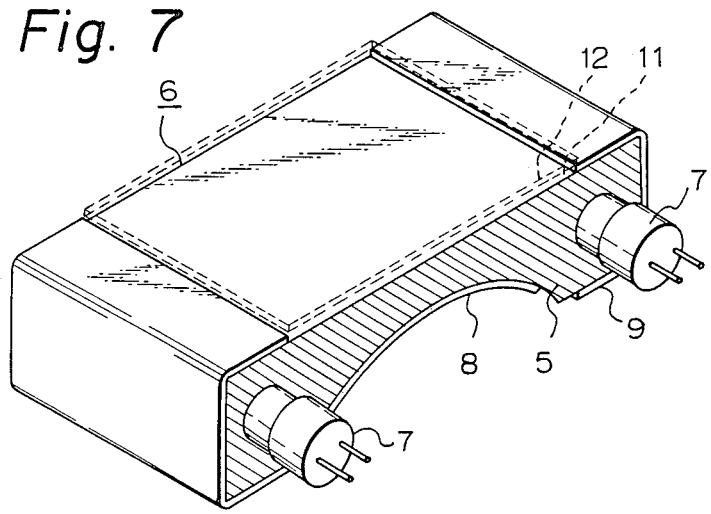
FIG. 7 is an embodiment in which the illuminating apparatus of the present invention is used as a back light of a liquid crystal display; and, FIG. 8 is a diagram illustrating the distribution of the brightness of light emitted from the surface of the back light shown in FIG. 7.

In a back light comprising the illuminating apparatus of the present invention, a luminous portion 5 formed of a resin containing a fluorescent dye is embedded in a body portion 6 composed of a transparent resin, and light sources 7 arranged on both sides of the luminous portion 5 are embedded in the body portion 6 along the peripheral edge. On one surface of the body portion 6, a reflecting film 8 is disposed along the peripheral edge of the light source-embedded part of the body portion 6 to reflect the light incident from the light source 7 toward the luminous portion 5. In FIG. 7, a diffusion plate 11 arranged on this back light and a liquid crystal display panel 12 arranged above the diffusion plate 11 are indicated by broken lines.

Figure 8:
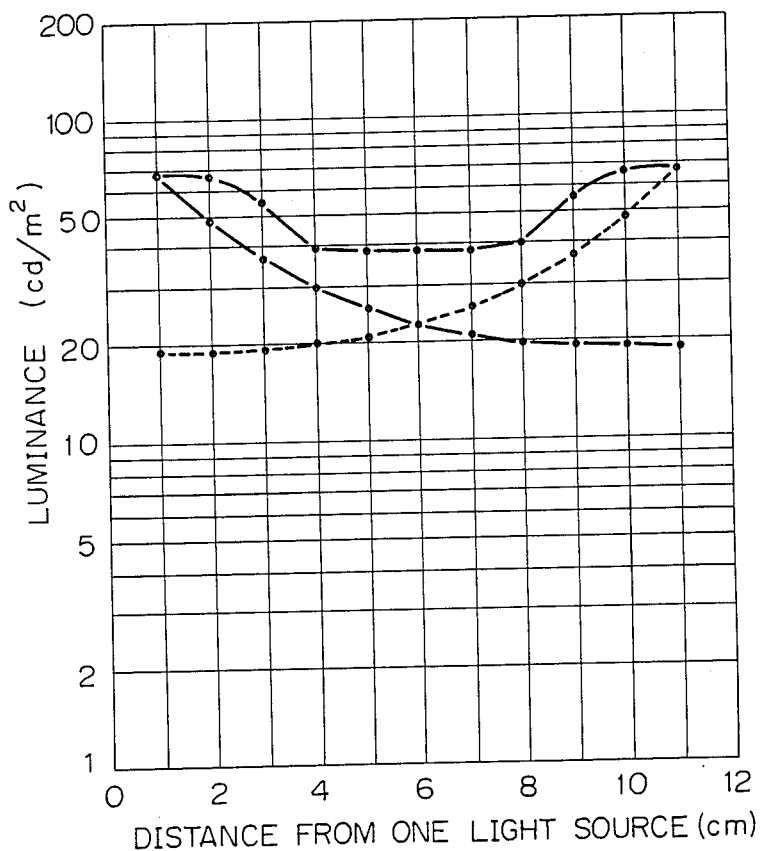

FIG. 8 illustrates the brightness distribution in the above-mentioned back light. Namely, results obtained by arranging tungsten lamps on both sides of the length direction of the luminous portion 5 having a thickness of 5 mm, a width of 12 mm, and a length of 100 mm, apart by 10 mm therefrom and measuring the brightness of the light emitted to the surface of the back light are shown in FIG. 8.

As shown in FIG. 8, if both light sources are lit although each is a spot light source of 1.2 W, a brightness of $55\pm18$ cd/m$^2$ is obtained, and this brightness is higher than the brightness (about 50 cd/m$^2$) of an EL (electro-luminescence) element heretofore used as the back light. It is considered that the life of the tungsten lamp in the normal application state is longer than 10,000 hours, and if the illuminating apparatus of the present invention is used, a back light having a much longer life than that of the EL element, the brightness of which is reduced by half in about 5000 hours, can be provided.

We claim:

1. An illuminating apparatus which comprises a plane board composed of a transparent resin having an organic fluorescent dye incorporated therein and a light-reflecting member arranged on at least a part of the back surface of the plane board, wherein a light incident from at least a part of the end face of the plane board is emitted from at least a part of the surface of the plane board.

2. An apparatus as set forth in claim 1, wherein the transparent resin is selected from the group consisting of polycarbonate, polystyrene, polymethyl methacrylate and a blend of polymethyl methacrylate and polyvinylidene fluoride.

3. An apparatus as set forth in claim 1, wherein the organic fluorescent dye is selected from the group consisting of a perylene type fluorescent dye, a naphthalimide type fluorescent dye and a cumarine type fluorescent dye.

4. An apparatus as set forth in claim 1, wherein a light source is arranged on at least one end of the plane board 5. An apparatus as set forth in claim 4, wherein the light source is a tungsten lamp or LED or fluorescent lamp.

6. An apparatus as set forth in claim 1, wherein the light-reflecting member is a white paint layer, an aluminum foil or a roughened surface.

7. An apparatus as set forth in claim 1, wherein the light-reflecting member is reflectance-variable.

8. An apparatus as set forth in claim 1, wherein the light-guiding member is further disposed on the surface of the plane board.

9. An apparatus as set forth in claim 1, which is used as a back light of a liquid crystal display panel.

* * * * *

UNITED STATES PATENT AND TRADEMARK OFFICE
CERTIFICATE OF CORRECTION

PATENT NO. : 4,779,166
DATED : October 18, 1988
INVENTOR(S) : Akira Tanaka et al It is certified that error appears in the above-identified patent and that said Letters Patent is hereby corrected as shown below:

Column 1, line 60, delete "6A and".

Column 3, line 3, "notche" should be --notches--.

Column 4, line 52, "board" should be --board.--.

Signed and Sealed this

Fourteenth Day of March, 1989

Attest:

DONALD J. QUIGG

*Attesting Officer*   *Commissioner of Patents and Trademarks*